US012679304B1

(12) United States Patent
Katz et al.

(10) Patent No.: US 12,679,304 B1
(45) Date of Patent: Jul. 14, 2026

(54) VEHICLE ALARM SYSTEMS AND METHODS

(71) Applicant: UIPCO, LLC, San Antonio, TX (US)

(72) Inventors: Brian Howard Katz, San Antonio, TX (US); Surender Kumar, Palatine, IL (US); Jeffrey Thomas Cavanaugh, Sun City, AZ (US); Daniel Diaz, San Antonio, TX (US); Jennifer Holly Nance, San Antonio, TX (US); Robert Christian Law, Plano, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 212 days.

(21) Appl. No.: 18/497,208

(22) Filed: Oct. 30, 2023

Related U.S. Application Data

(60) Provisional application No. 63/421,057, filed on Oct. 31, 2022.

(51) Int. Cl.
| | |
|---|---|
| *B60R 25/104* | (2013.01) |
| *B60R 25/30* | (2013.01) |
| *G06T 7/70* | (2017.01) |
| *G06V 10/82* | (2022.01) |
| *G06V 20/56* | (2022.01) |
| *G06V 40/10* | (2022.01) |

(52) U.S. Cl.
CPC .......... *B60R 25/104* (2013.01); *B60R 25/305* (2013.01); *G06T 7/70* (2017.01); *G06V 10/82* (2022.01); *G06V 20/56* (2022.01); *G06V*

*40/10* (2022.01); *G06T 2207/30196* (2013.01); *G06T 2207/30252* (2013.01)

(58) Field of Classification Search
CPC ....... B60R 25/104; B60R 25/305; G06T 7/70; G06T 2207/30196; G06T 2207/30252; G06V 10/82; G06V 20/56; G06V 40/10
See application file for complete search history.

(56) References Cited

U.S. PATENT DOCUMENTS

| | | | | |
|---|---|---|---|---|
| 9,315,152 B1 * | 4/2016 | Maestas | ................. | G01S 19/13 |
| 2003/0071735 A1 * | 4/2003 | Hanson | ................. | A01M 29/16 |
| | | | | 340/573.2 |
| 2012/0323474 A1 * | 12/2012 | Breed | .................... | G08G 1/161 |
| | | | | 701/117 |
| 2013/0342333 A1 * | 12/2013 | Hutchings | ........ | G08B 13/19647 |
| | | | | 348/148 |
| 2014/0375476 A1 * | 12/2014 | Johnson | ................ | B60R 25/102 |
| | | | | 340/932.2 |

(Continued)

*Primary Examiner* — Daryl C Pope
(74) *Attorney, Agent, or Firm* — Plumsea Law Group, LLC

(57) ABSTRACT

A system and method for activating alarms in motor vehicles in response to detecting alarms from other nearby vehicles. This is accomplished by using sound emitting devices in vehicles that can emit two substantially different sounds: a first "warning" sound and a second "messaging" sound. The warning sound provides an audible alert that may be recognizable to anyone near the vehicle and which is intended to scare off the thief/vandal. The messaging sound may or may not be audible, and has the purpose of communicating information about a potential break-in to nearby vehicles, which can take further action based on the detected messaging sound. In particular, the other alarm systems may be activated when the messaging sound is detected.

13 Claims, 12 Drawing Sheets

(56)          References Cited

U.S. PATENT DOCUMENTS

2019/0143936 A1* 5/2019 Abel Rayan .......... H04W 12/68
                                            701/2
2023/0199149 A1* 6/2023 Wilson ................... H04N 7/181
                                          348/148

* cited by examiner

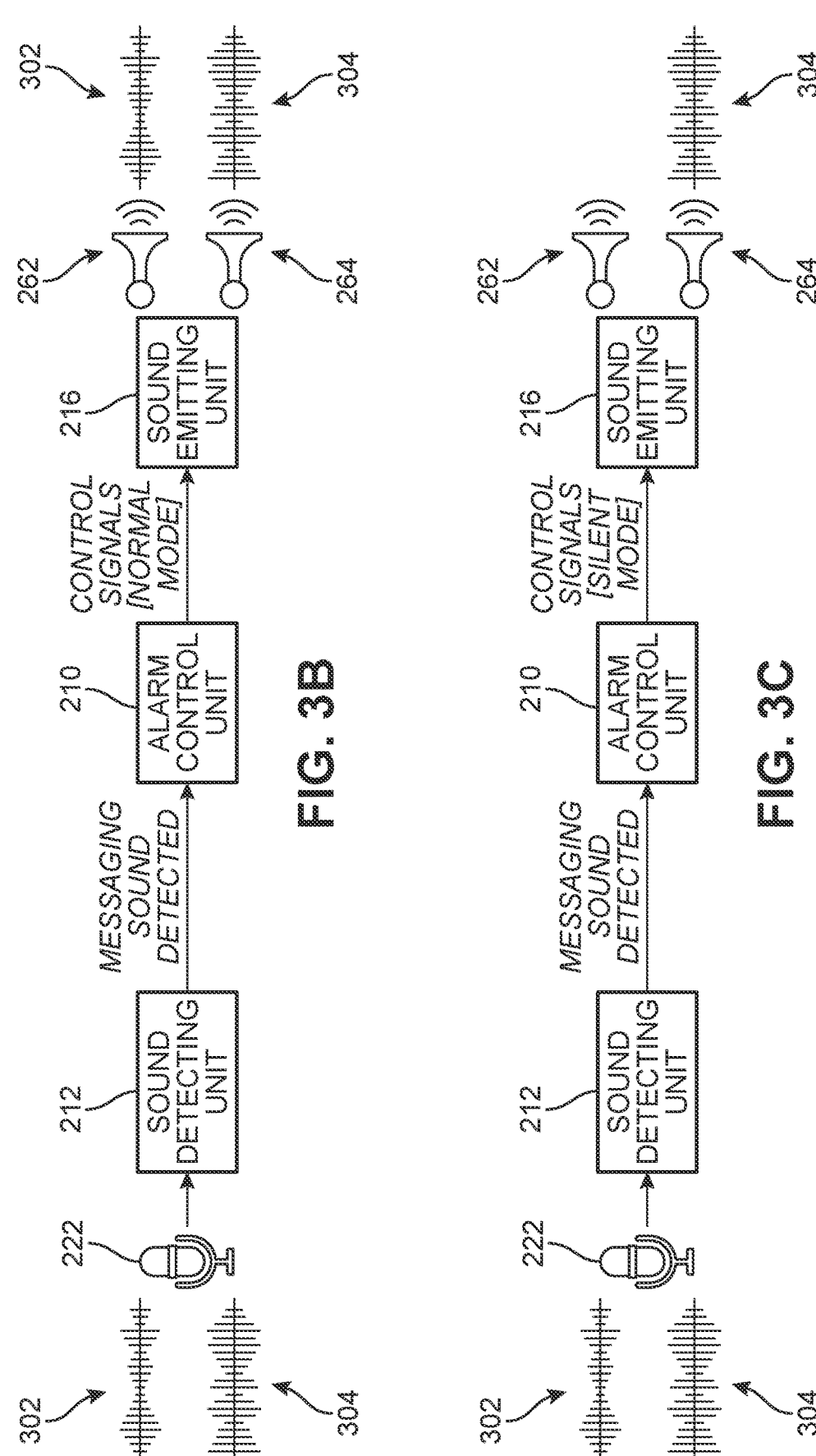

800

RETRIEVE GPS
FOR MOTOR VEHICLE     802

RETRIEVE GIS INFORMATION
FOR CURRENT GPS POSITION     804

806

IS
VEHICLE
LOCATED IN HIGH
VEHICLE DENSITY AREA
(E.G., A PARKING
LOT)?

NO     YES 808     810

SET ALARM
SYSTEM TO
NORMAL
MODE

SET ALARM
SYSTEM TO
SPOTLIGHT
MODE

1000

ENTER GUIDANCE MODE — 1002

RETRIEVE GPS
FOR MOTOR VEHICLE — 1004

RETRIEVE GIS INFORMATION
FOR CURRENT GPS POSITION — 1006

RETRIEVE GUIDANCE PATTERN — 1008

DETERMINE GUIDE STATE FOR
VEHICLE BASED ON GIS INFORMATION
AND RETRIEVED GUIDANCE PATTERN — 1010

1012
MESSAGING
SOUND
DETECTED?

NO

YES

1014
GUIDE
STATE?

PASSIVE

ACTIVE

1016
EMIT
MESSAGING
SOUND
ONLY

1018
EMIT
WARNING AND
MESSAGING
SOUNDS

VEHICLE ALARM SYSTEMS AND METHODS

CROSS-REFERENCE TO RELATED APPLICATIONS

This application claims the benefit of Provisional Patent Application No. 63/421,057 filed Oct. 31, 2022, and titled "Vehicle Alarm Systems and Methods," which is incorporated by reference herein in its entirety.

TECHNICAL FIELD

The present disclosure generally relates to alarm systems, and in particular to alarm systems for motor vehicles.

BACKGROUND

Alarm systems for motor vehicles may trigger honking, sirens, and/or flashing lights when someone attempts to break into, or vandalize, the motor vehicle. The noise and lights may warn off the potential thief or vandal. However, current systems do not transmit any useful information to nearby vehicles that could be used to deter the thief or vandal from trying to break into those other vehicles or deterring the thief or vandal's activity on the primary motor vehicle through such information transfer to other nearby vehicles.

There is a need in the art for a system and method that addresses the shortcomings discussed above.

SUMMARY

In some aspects, the techniques described herein relate to an alarm system for a motor vehicle, including: a sound emitting unit that emits a first sound and a second sound, wherein the first sound is substantially different from the second sound; a sound detecting unit, the sound detecting unit configured to detect sounds that are substantially similar to the second sound; and an alarm control unit; wherein when the alarm control unit receives information indicating that the sound detecting unit has detected the second sound, the alarm control unit signals the sound emitting unit to emit the first sound and the second sound.

In some aspects, the techniques described herein relate to a system for a motor vehicle, including: an alarm control unit; a sound emitting unit that emits a first sound and a second sound, wherein the first sound is substantially different from the second sound; a sound detecting unit, the sound detecting unit configured to send a first triggering signal to the alarm control unit when the sound detecting unit detects sounds sufficiently similar to the second sound; a person detecting unit that receives information from a sensing device of the motor vehicle, and wherein the person detecting unit is configured to send a second triggering signal to the alarm control unit when the person detecting unit detects a person sufficiently close to the motor vehicle; and wherein when the alarm control unit receives the first triggering signal and the second triggering signal within a sufficiently close period of time, the alarm control unit signals the sound emitting unit to emit the first sound and the second sound.

In some aspects, the techniques described herein relate to a method of controlling an alarm system in a motor vehicle, including: detecting, using a sound detecting unit of the alarm system, a messaging sound; triggering, in response to detecting the messaging sound, a sound emitting device to emit the messaging sound.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIGS. 3A-3C illustrate schematic views of various operating configurations of an alarm system in which an alarm is triggered based on detecting sounds, according to an embodiment.

DESCRIPTION OF EMBODIMENTS

Figures 1A, 1B:
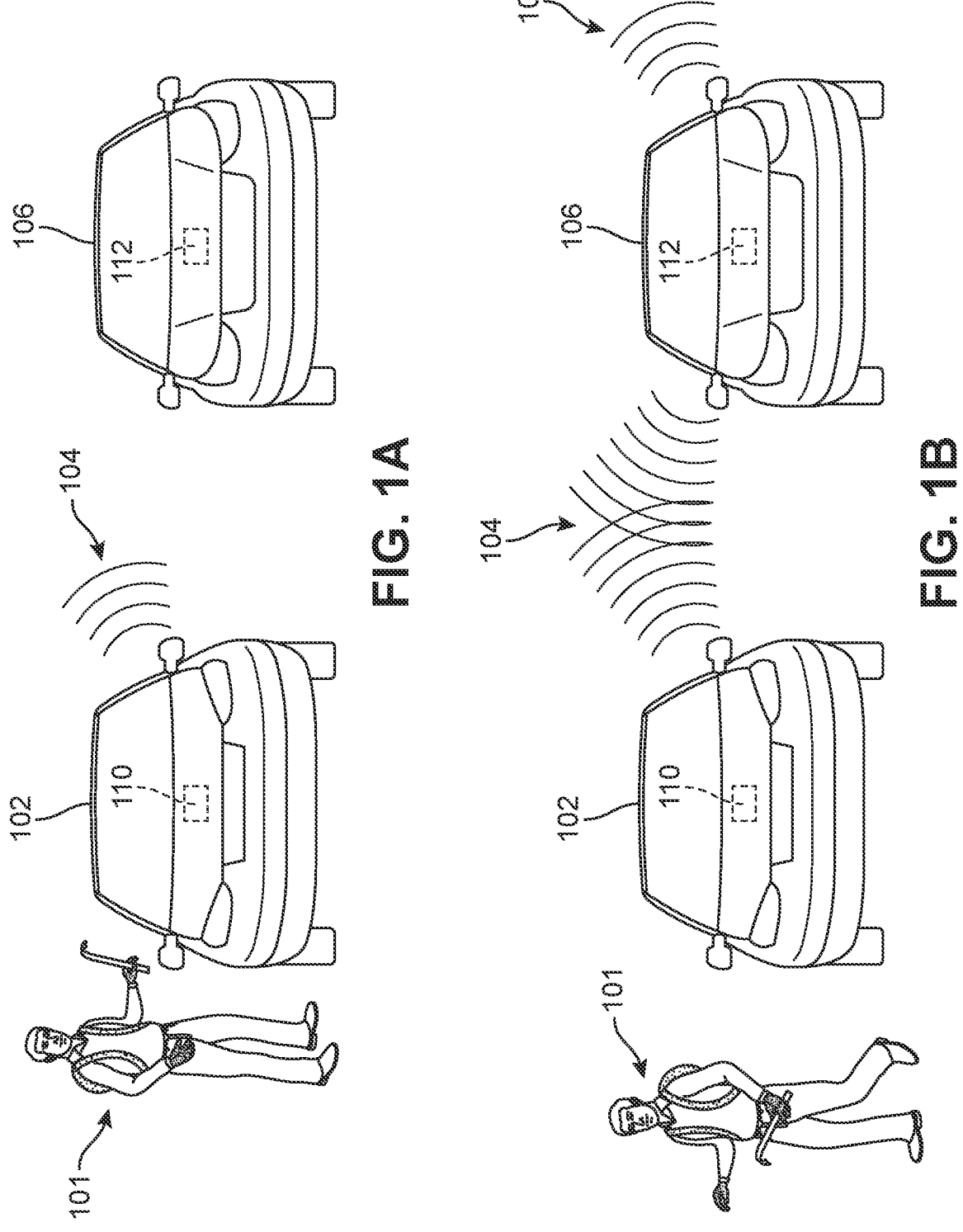
FIGS. 1A-B are schematic views of a vehicle alarm in one vehicle generating sounds to trigger an alarm in a nearby vehicle, according to an embodiment.

The embodiments provide systems and methods for activating alarms in motor vehicles in response to detecting alarms from other nearby vehicles. This is accomplished by using sound emitting devices within each vehicle that can emit two substantially different sounds: a first "warning" sound and a second "messaging" sound. The warning sound provides an audible alert that may be recognizable to anyone near the vehicle and which is intended to scare off the thief/vandal. The warning sound may be configured as a conventional alarm sound. The messaging sound may or may not be audible, and has the purpose of communicating information about a potential break-in to nearby vehicles, which can take further action based on the detected messaging sound. In particular, the other alarm systems may be activated when the messaging sound is detected. The messaging sound may therefore act as an "out-of-band" signal that provides information to other alarm systems outside the regular frequency range of the warning alarm. Using a second sound adds additional control for the system that can be utilized to achieve various kinds of alarm patterns, as discussed in further detail below.

The proposed systems and methods allow nearby vehicles to "wake up" and alert other nearby vehicles, creating a relay or daisy-chain effect. By setting off alarms in multiple vehicles (nearly) simultaneously, the thief/vandal may be deterred from attempting to break into and/or vandalize other nearby vehicles. Setting off multiple alarms may also have the effect of alerting more individuals to the presence of a potential thief/vandal in the area.

The use of audio/acoustic channels for messaging nearby vehicles allows the system to be utilized in vehicles where other communication channels between vehicles is not possible or not desirable. This simplifies the architecture of the alarm system and allows it to operate agnostically with respect to the available digital communications operating in a motor vehicle. Moreover, using audio/acoustic channels limits or eliminates the risk that the alarm system itself can be hacked, or spoofed, as compared to alarm systems that might communicate with one another using digital modes of communication (such as Wi-Fi or other similar wireless networking protocols).

Various terms used throughout the detailed description and in the claims are defined here for clarity.

As used herein, a "sound emitting device" is any device that can create vibrations in the air that can be detected by a person or another device. Examples of sound emitting devices are horns, sirens, and speakers. Sound emitting devices could emit sounds at a single frequency, at a range of frequencies, or over multiple different ranges of frequencies and waveforms. As an example, some horns could be configured to emit sounds that comprise a particular set of frequencies. By contrast, a speaker could be configured to emit various different sounds, depending on the electrical input, having any different kinds of frequency characteristics.

Two sounds may be "substantially different" if they are comprised of different ranges of frequencies, waveforms, or otherwise distinguishable by a person or device as separate sounds. One example of two sounds that are substantially different are two different notes or tones that may be generated by a device such as a horn, siren, or speaker.

Sounds may be "audible" or "inaudible." An audible sound is one that can be detected by a person without the aid of a device. An inaudible sound may not be detected by a person, but may be detected by a device sensitive to the particular frequencies of the sound.

The term "unit" refers to any collection of hardware and/or software components. The term "module" may also refer to any collection of hardware and/or software components, though module may be used more frequently to refer to software modules, which are components of a software application.

As used herein, the term "triggering signal" refers to any signal or information that, when received by a device, unit, module or other system, triggers that same device, unit, module or system to take some action. An example of a triggering signal is a signal that conveys information about a parameter, such that an action may be taken when the parameter has a particular value, or falls into a range of values.

FIG. 1A is a schematic view of a scenario in which a thief 101 is attempting to break into a vehicle 102. In response to detecting the attempted break in, an alarm system 110 within vehicle 102 is activated, which generates sounds 104. Sounds 104 act to warn-off thief 101 and, as described in further detail below, also act to trigger a similar alarm response (sounds 108) in a nearby vehicle 106, as shown in FIG. 1B. This is accomplished by using a system that generates both a first ("warning") sound that provides an audible alert, and a second sound that acts as a signal that may trigger a corresponding alarm system within vehicle 106. This second ("messaging") sound could be audible or inaudible. As these two sounds may be played simultaneously, the effect of this system is to relay the alarm from one vehicle to nearby vehicles.

Figure 2:
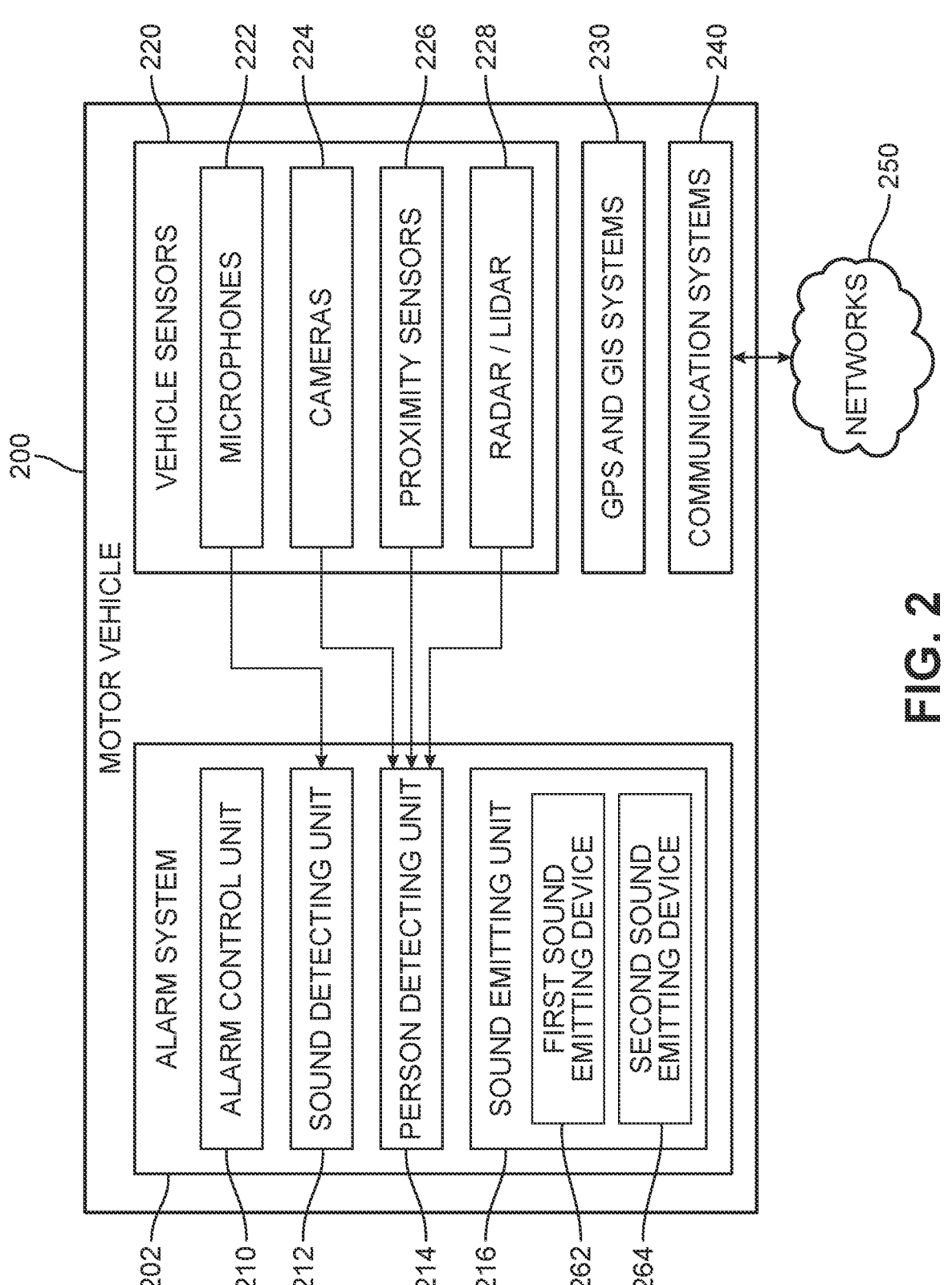
FIG. 2 is a schematic view of a motor vehicle including an alarm system, according to an embodiment.

FIG. 2 is a schematic view of a motor vehicle 200 that may be configured with an alarm system 202, as well as other components. Alarm system 202 may comprise multiple discrete units or systems that communicate with one another to facilitate detecting and emitting sounds, as well as to perform other functions. As seen in FIG. 2, alarm system 202 can include an alarm control unit 210, a sound detecting unit 212, a person detecting unit 214, and a sound emitting unit 216.

Motor vehicle 200 can also include one or more vehicle sensors 220. These may include, but are not limited to microphones 222, cameras 224, proximity sensors 226, and radar/lidar devices 228. In some cases, these vehicle sensors could be embedded into motor vehicle 200, while in other cases they could be removable devices. In some cases, for example, sensors embedded into other user devices such as smartphones and smart watches could capture information that could be retrieved and used by other systems of motor vehicle 200 (such as alarm system 202).

Alarm control unit 210 may comprise hardware and software for receiving signals or other information from any of vehicle sensors 220, and/or from sound detecting unit 212 and/or person detecting unit 214. Based on this received information, alarm control unit 210 could control sound emitting unit 216 to emit one or more sounds.

Sound detecting unit 212 may comprise hardware and software to receive and process sound information. For example, sound detecting unit 212 could be configured to receive sound information (audio signals) from microphones 222. Sound detecting unit 212 could also comprise suitable algorithms for identifying and analyzing audio signals to determine if a predetermined sound or sounds has been detected. Examples of suitable algorithms for identifying predetermined sound(s) include, but are not limited to, algorithms that leverage Gaussian Mixture Models (GMMs), Hidden Markov Models (HMMs), Fourier Transformations, deep neural networks, or other suitable algorithms. Moreover, where machine learning algorithms are used, the models can be trained on a corpus of sound data to accurately classify various sounds, including identifying a predetermined sound(s), such as the messaging sound described above.

Sound detecting unit 212 may be further configured to communicate with alarm control unit 210. In particular, if sound detecting unit 212 detects a predetermined sound, sound detecting unit 212 provides this information to alarm control unit 210 which can act on this information. For example, alarm control unit 210 may command sound emitting unit 216 to emit one or more sounds in response to information received from sound detecting unit 212.

Person detecting unit 214 may comprise hardware and software to receive and process information for the purposes of identifying if there is a person near the motor vehicle. For example, person detecting unit 214 could be configured to receive image information from cameras 224. In some cases, person detecting unit 214 could also receive information from one or more proximity sensors 226 and/or radar/lidar devices 228. Using one or more sources of sensed information, person detecting unit 214 may detect a person at or near a vehicle. If a person is detected, this information can then be passed to alarm control unit 210, which can act on this information.

Sound emitting unit 216 may include hardware and software for emitting sounds. In the embodiment shown in FIG. 2, sound emitting unit 216 includes a first sound emitting device 262 that is configured to emit a first sound and a second sound emitting device 264 that is configured to emit a second sound. Here, the first sound and the second sound may be substantially different sounds with different frequency and waveform characteristics. Whereas the first sound generated by first sound emitting device 262 may comprise a general "alarm" or "alert" sound, the second sound emitted by second sound emitting device 264 may be a messaging sound intended to provide information to nearby vehicle alarm systems (or non-vehicular mobile or stationary alarm security systems) in order to trigger those nearby alarm systems. Any suitable sound could be used for the second sound. In some cases, the second sound could be inaudible, or generally lower in frequency so as not to distort the more familiar "alarm" sound generated by first sound emitting device 262.

Motor vehicle 200 may also include GPS and GIS (geographic information system) systems 230. In some cases, GPS and GIS systems 230 could comprise a separate GPS receiver for detecting the GPS location of the motor vehicle, along with a GIS system or interface for a remote GIS system that can provide geographic information about the surrounding area where the motor vehicle is located. Exemplary GIS systems include various commercial mapping systems.

Motor vehicle 200 may also include communication systems 240. Communication systems 240 can comprise any suitable systems that allow components of motor vehicle 200 to communicate over various networks 250, including wireless networks. For example, communication systems 240 could comprise one or more wireless networking cards configured to communicate over Wi-Fi, cellular networks, personal area networks, or any other suitable networks. In one embodiment, communication systems 240 may enable motor vehicle 200 to communicate with nearby vehicles using the Vehicle-to-vehicle (V2V) communications protocol.

The exemplary system provides multi-functionality, since an alarm system may be activated in response to different kinds of triggers. A first trigger for the alarm system occurs when there is a physical interaction with the same vehicle where the alarm system is installed. In this case, alarm control unit 210 detects attempted break-ins or vandalism directly, in response to information from onboard sensors, and activates the alarm system. A second trigger for the alarm system occurs when the system detects a "messaging sound" from a nearby vehicle. In this second case, alarm control unit 210 detects the predetermined messaging sound that has been emitted by another vehicle, and activates the alarm system in response. In particular, the alarm can be activated even when there are no indications of a break-in or vandalism at the vehicle where the alarm system is installed.

This multi-function operation may be best understood with respect to FIGS. 1A-1B. In this scenario, a first alarm system 110 within vehicle 102 detects an attempted break-in based on sensed information from sensors at vehicle 102. Once the alarm from vehicle 102 is triggered, another alarm system 112 operating in nearby vehicle 106 detects sounds 104 and activates its own alarm, which results in the generation of sounds 108. Moreover, as discussed in further detail below, sounds 108 generated by second alarm system 112 may further be detected by yet another vehicle (not shown), whose own alarm system can also be triggered by sounds 108. This can be used to create a daisy-chain effect in which multiple vehicle alarms are triggered within an area even though a thief has only tried to break-in or vandalize one of those vehicles.

Figure 3A:
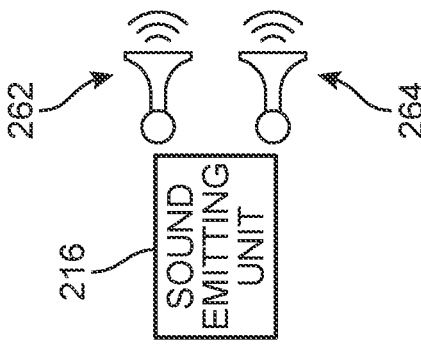
Figure 3A:
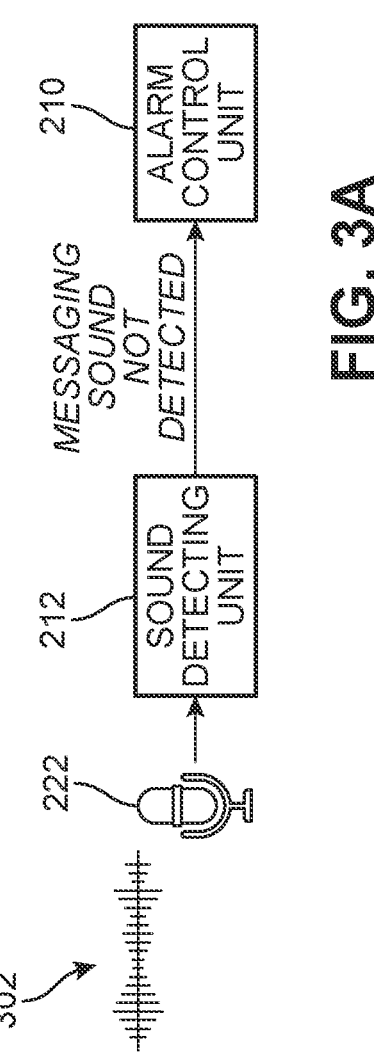

FIGS. 3A-3C illustrate schematic views of various operating configurations of an alarm system in which an alarm is triggered based on detecting messaging sounds. Referring first to FIG. 3A, a warning sound 302 is detected at microphones 222 and processed by sound detecting unit 212. Sound detecting unit 212 may be configured to detect sounds substantially similar to the messaging sound emitted by second sound emitting device 264 (as in FIG. 2). Because the incoming sounds in FIG. 3A comprise only warning sound 302 and not an additional messaging sound, sound detecting unit 212 does not trigger alarm control unit 210. Therefore, no sounds are emitted by sound emitting unit 216.

In the scenario shown in FIG. 3B, the incoming sounds comprise both warning sound 302 and a separate messaging sound 304. Thus, sound detecting unit 212 detects the messaging sound and sends this information to alarm control unit 210. Alarm control unit 210, responding to this trigger, then sends a control signal to sound emitting unit 216. More specifically, alarm control unit 210 sends a signal causing sound emitting unit 216 to emit sounds in a "normal mode." In the normal mode, sound emitting unit 216 emits both warning sound 302 and messaging sound 304.

In another mode of operation, shown in FIG. 3C, the system could operate in a "silent mode." In this silent mode, upon detecting a messaging sound being emitted from another vehicle, alarm control unit 210 may instruct sound emitting unit 216 to emit only a messaging sound (without also emitting a warning sound). The messaging sound could be inaudible, in some cases. This allows nearby vehicles to "silently" signal one another. As described in further detail below, the silent mode can be used to signal multiple vehicles over an area even if only select vehicles emit an audible alarm.

Some embodiments could include provisions to avoid possible issues that might occur when a sound detecting unit of an alarm system detects messaging sounds emitted from the sound emitting unit of that same alarm system. Such a scenario, if not mitigated against, could result in an undesirable feedback loop where an alarm system continues to emit a messaging signal indefinitely because it is constantly detecting its own messaging signal. In some embodiments, for example, a system could incorporate additional logic that checks if the sound emitting unit is already emitting a messaging sound. In that case, the system need not check for messaging sounds. In other words, the system may only check for a messaging sound (and take further action) whenever the messaging sound is not already being generated by the same system.

In areas with high vehicle density, the configurations shown in FIGS. 3A-3C could result in too many vehicles emitting alarms, which could aggravate nearby residents, and cause confusion. To mitigate against uncontrolled spread of alarms, some embodiments could utilize additional criteria to determine if an alarm should be activated to emit both warning sounds and messaging sounds.

Figure 4:
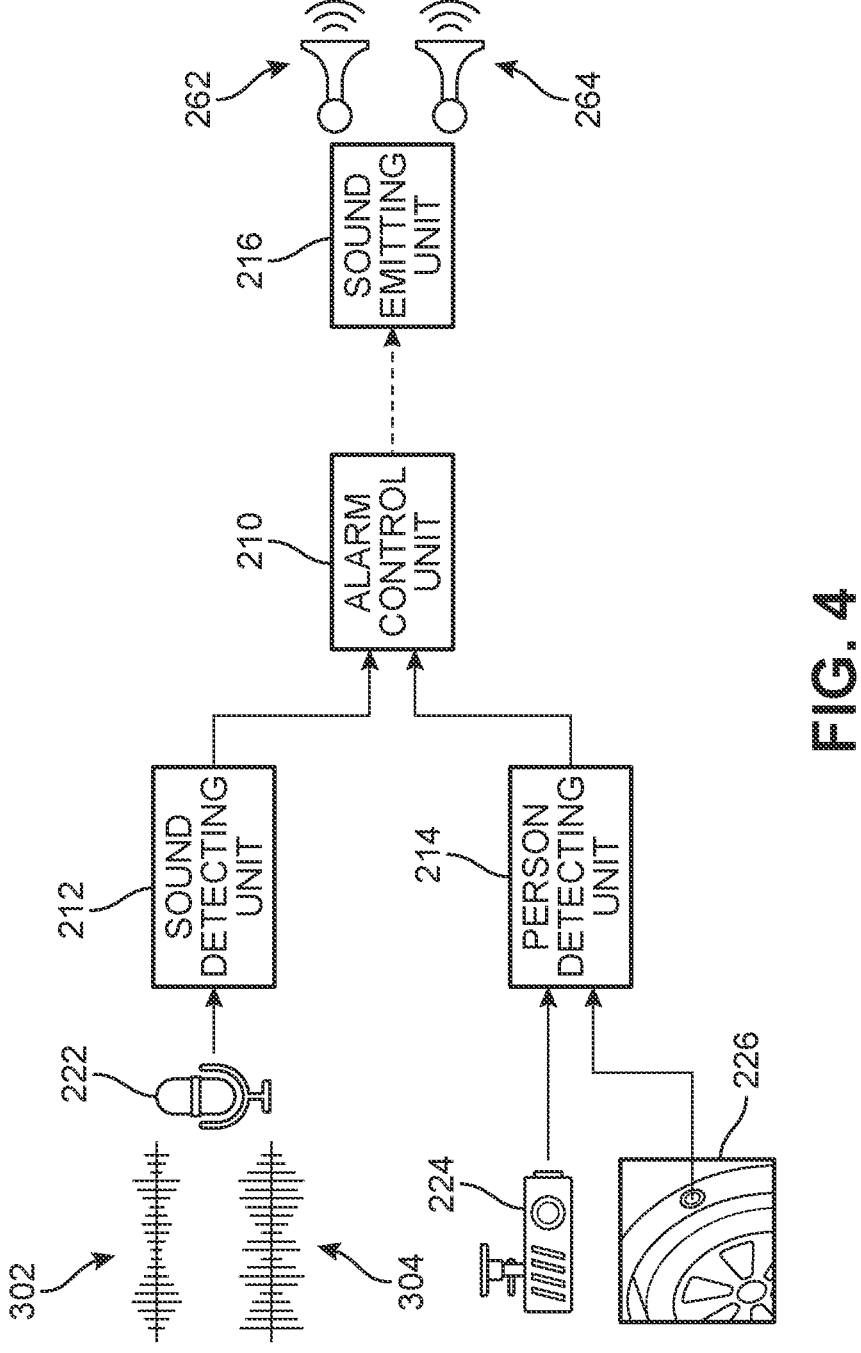
FIG. 4 is a schematic view of an operating configuration of an alarm system in which the alarm is triggered only when the second sound is detected and when the system detects that there is a person nearby to the motor vehicle, according to an embodiment.

FIG. 4 is a schematic view of an operating configuration of an alarm system in which the alarm is only triggered when two conditions occur (nearly) simultaneously. The first condition is that the messaging sound is detected and the second condition is that a person has been detected nearby to the motor vehicle. Using this operational configuration, only those vehicles relatively close to a potential thief/vandal would activate alarms in response to detecting a messaging sound from another vehicle.

Referring to FIG. 4, in this operational configuration, sounds may be received at sound detecting unit 212. Additionally, various kinds of sensed information, including images from cameras 224 and proximity data from proximity sensors 226, could be received at person detecting unit 214. In this configuration, an alarm may only be activated when both sound detecting unit 212 and person detecting unit 214 are triggered within a substantially close period of time.

Figure 5:
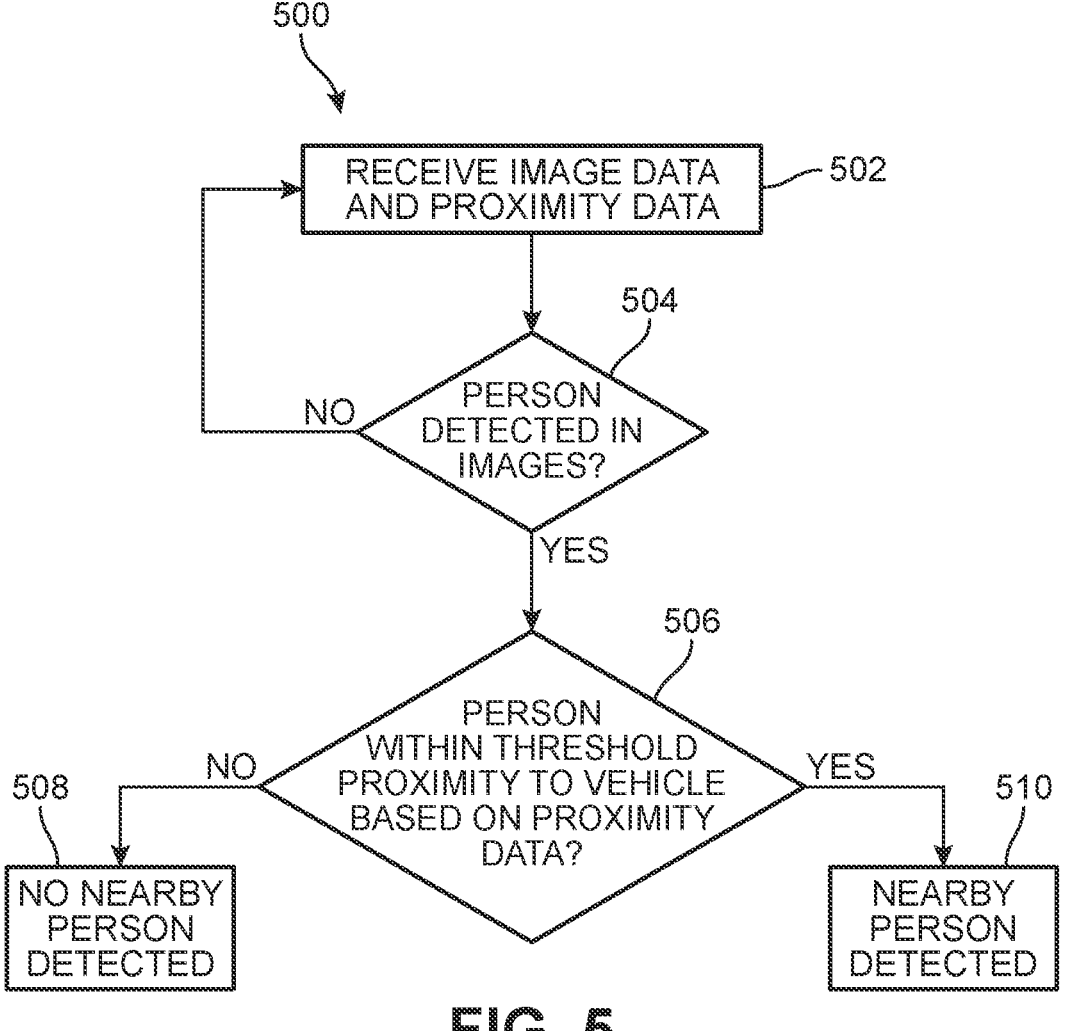
FIG. 5 is a schematic view of a process for a person detecting unit, according to an embodiment.

FIG. 5 is a schematic view of a process 500 for a person detecting unit 214 (see FIG. 2), according to an embodiment. Starting in step 502, person detecting unit 214 may receive image data and proximity data. The image data could be received from one or more cameras 224 within, or externally mounted on, the motor vehicle. Proximity data could be received from proximity sensors 226. Alternatively, in some cases, lidar, sonar (or similar acoustic reflectivity technology), and/or radar data could be used to determine the proximity of an object to the motor vehicle.

In step 504, person detecting unit 214 decides if a person has been detected in the images. Detecting the presence of a person can be achieved using any suitable computer visions algorithms. In some embodiments, a suitably trained convolutional neural network could be used to identify the presence of a person in one or more images taken by vehicle cameras. In other embodiments, other suitable machine learning models for person detection/object detection could be used.

If no person has been detected in step 504, person detecting unit 214 may return to step 502. If a person has been detected, person detecting unit 214 proceeds to step 506. In step 506, person detecting unit 214 may determine if the detected person is near the vehicle based on the received proximity data (from proximity sensors and/or radar or lidar systems). As used herein, a detected person may be near to a vehicle whenever the person is within a threshold distance of the outer perimeter of the vehicle. For example, a threshold distance could be set to one foot in one embodiment, so that a person is determined to be near to the vehicle when they are determined to be no more than one foot away from the front, back or sides of the vehicle based on proximity measurements. Any other suitable range of threshold distances could be also used.

If the person is determined to be near the vehicle, person detecting unit 214 proceeds to step 510. In step 510, person detecting unit 214 may transmit information to an alarm control system indicating that a person near to the vehicle has been detected. Otherwise, person detecting unit 214 proceeds to step 508, indicating that no nearby person has been detected.

An optional step, not shown in the process in FIG. 5, includes comparing the image of any person detected near the vehicle with a set of candidate images. These candidate images could be images of persons who have been in the vehicle recently. Thus, for example, following step 506, person detecting unit 214 could leverage computer vision algorithms to compare the captured images of any persons outside the vehicle with the candidate images, which could be stored locally or accessed from a remote server. By comparing images of a person detected near the vehicle with images of persons who have previously been inside the vehicle, this process could help reduce the number of false positives that occur with the exemplary alarm system.

Another optional step, not shown, for reducing false positives may include sending, via a wireless network, a message to a user (such as the vehicle owner) with an image of a possible suspect (as determined by person detecting unit 214). The message could comprise an alarm on the user's phone, along with the image. The user could then be given a predetermined time to respond in order to pre-emptively deactivate the alarm before it has sounded, or else to deactivate it shortly after it has started sounding.

Figure 6:
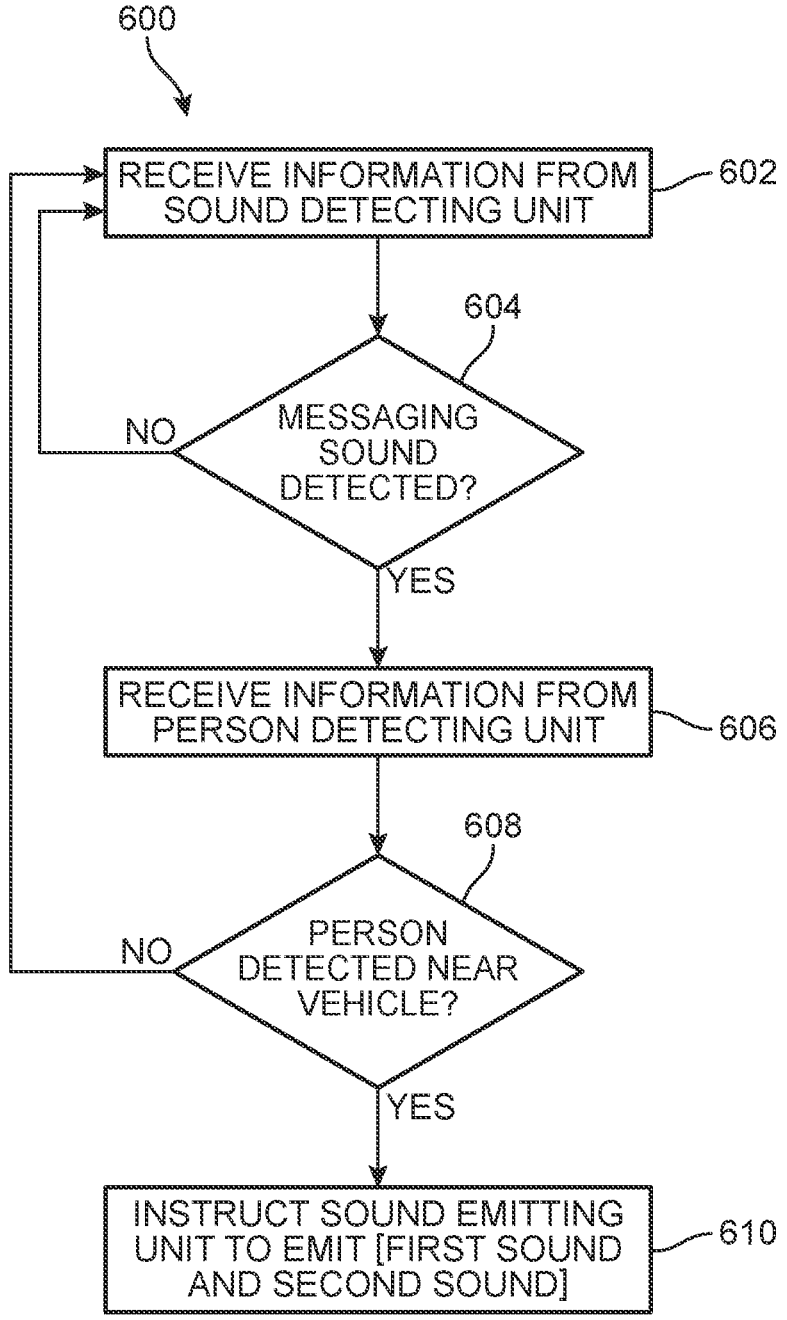
FIG. 6 is a schematic view of a process for an alarm control system, according to an embodiment.

FIG. 6 is a schematic view of a process 600 for an alarm control unit 210, according to an embodiment. Starting in step 602, alarm control unit 210 may receive information from sound detecting unit 212. In step 604, alarm control unit 210 determines if the predetermined messaging sound has been detected, based on the information received from sound detecting unit 212. If the messaging sound has been detected, alarm control unit 210 proceeds to step 606. Otherwise, alarm control unit 210 returns to step 602.

In step 606, alarm control unit 210 receives information from person detecting unit 214. In step 608, alarm control unit 210 determines if a person has been detected near the vehicle based on the information received from person detecting unit 214.

If no person has been detected, alarm control unit 210 may return to step 602. Otherwise, alarm control unit 210 proceeds to step 610 to instruct sound emitting unit 216 to emit the warning sound and the messaging sound.

With this process, an alarm may only be triggered when two conditions are met. First, the messaging sound is detected. Second, a person is detected nearby to the vehicle. This allows the alarm system to be selectively triggered based on whether a potential thief/vandal may be near a vehicle.

It may be appreciated that process 600 is intended to identify times when the above two conditions are met substantially simultaneously. In particular, the alarm may only sound when the two conditions occur within a sufficiently close period of time. Sufficiently close may be determined according to a threshold period. Examples of threshold periods that could be used include one second, five seconds, ten seconds, or thirty seconds. Increasing the threshold period reduces the sensitivity of the system to the presence of a person near the vehicle, since for increased periods the person could be near the vehicle for some time before or after the triggering sound from another vehicle is detected. Likewise, decreasing the threshold period increases the sensitivity so that an alarm is only activated when a person is detected near the vehicle at the same moment that the triggering sound from another vehicle is detected.

The different operational modes of the alarm system described above may facilitate different spatial patterns of alarms across multiple vehicles in some proximity of one another. These "alarm patterns" may provide utility by helping to focus or spotlight potential movements of a thief/vandal in areas with many vehicles (such as parking lots). Some alarm patterns may also be used to influence the movements of thieves/vandals who may be trying to flee an area after triggering an alarm.

Figure 7A:
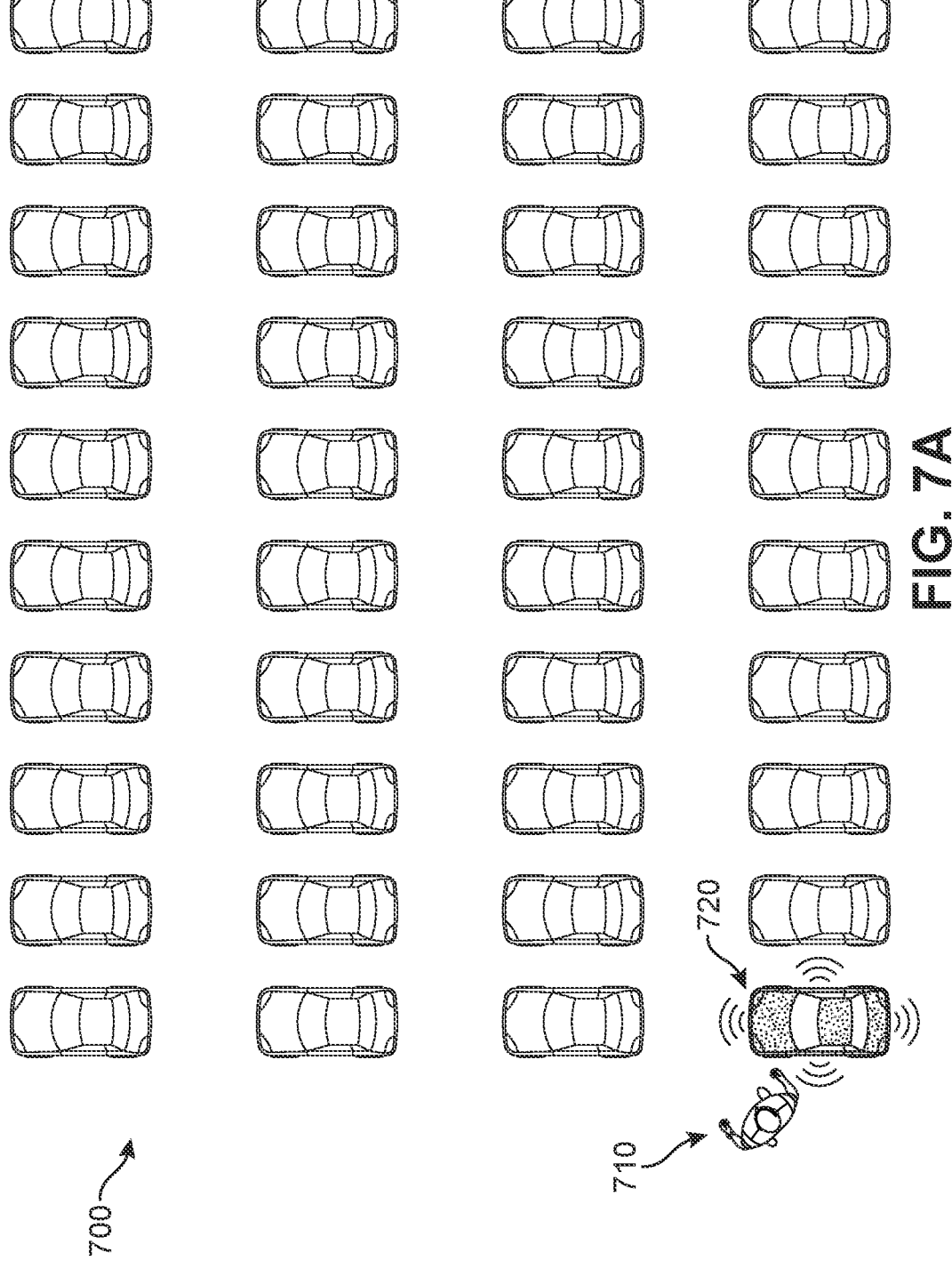
FIG. 7A is a schematic view of a thief attempting to break into a vehicle in a parking lot filled with vehicles.
Figure 7B:
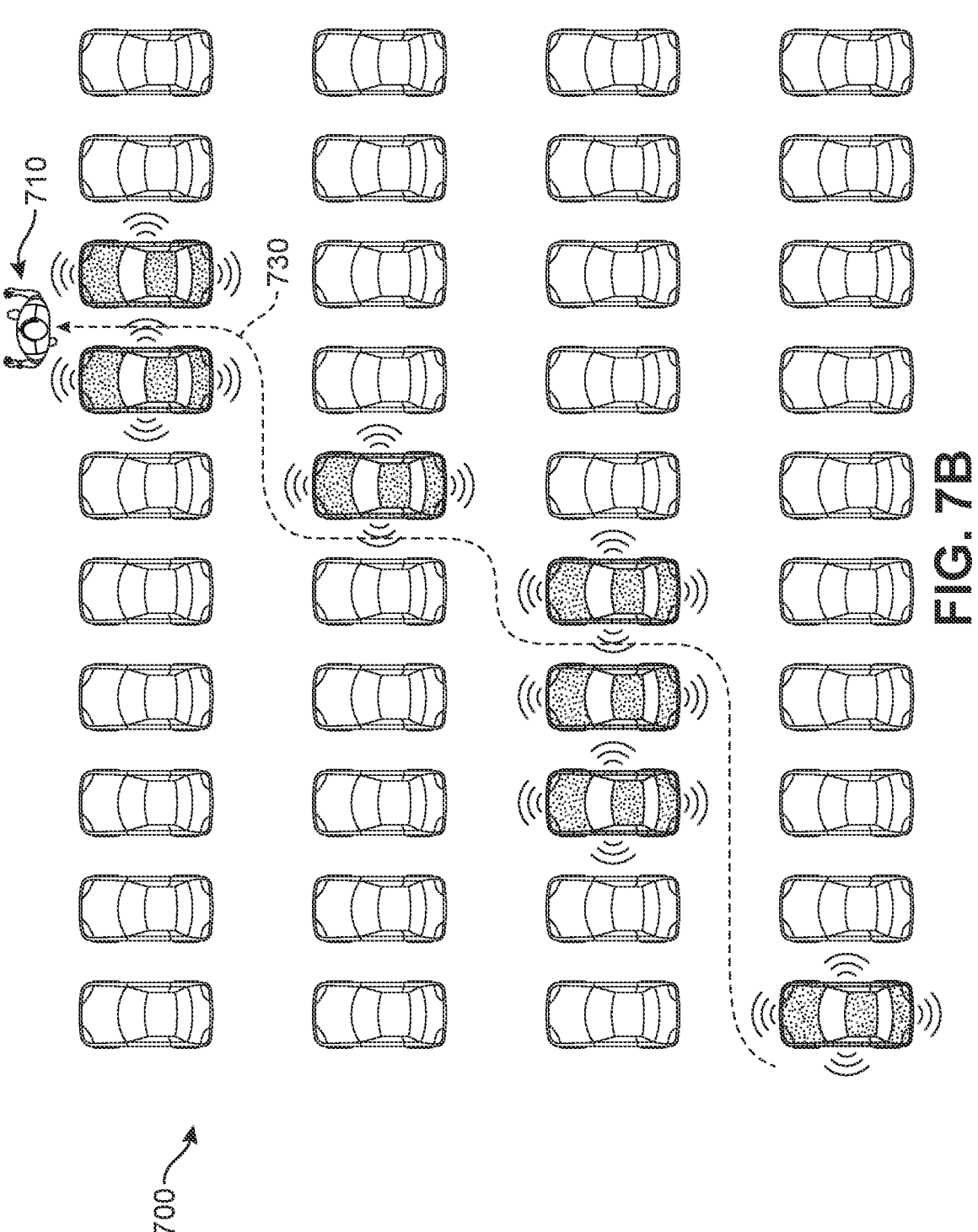
FIG. 7B shows a spotlight pattern of alarms among vehicles in a parking.

One exemplary alarm pattern is shown in FIGS. 7A-B. Referring to FIG. 7A, a parking lot 700 may be filled with many vehicles. In this example, it may be assumed that a majority of the vehicles in the parking lot are equipped with similar provisions to motor vehicle 200 described above and shown in FIG. 2. That is, each vehicle is equipped with an alarm system that can be triggered based on direct sensing of a break-in/vandalization, or by detecting messaging sounds from other vehicles. In FIG. 7A, a thief 710 is shown trying to break into a vehicle 720. In response to detecting the break-in, the alarm system of vehicle 720 is activated.

FIG. 7B shows a spotlight pattern of vehicles whose alarms have been triggered in parking lot 700. This pattern occurs when many vehicles in the parking lot operate using the triggering configuration of FIG. 4. Namely, the alarm systems of each vehicle may be triggered when a messaging sound is detected from another vehicle, and when a person is detected nearby. In this case, the result is that only alarms in those vehicles that thief 710 passes after triggering the alarm in vehicle 720 are activated. This creates a pattern 730 of vehicles within parking lot 700 that mimics the path taken by thief 710 as they try to flee from the parking lot. In some scenarios, this "path" of alarms could be used by police or other parties trying to follow and/or apprehend the thief/vandal.

Figure 8:
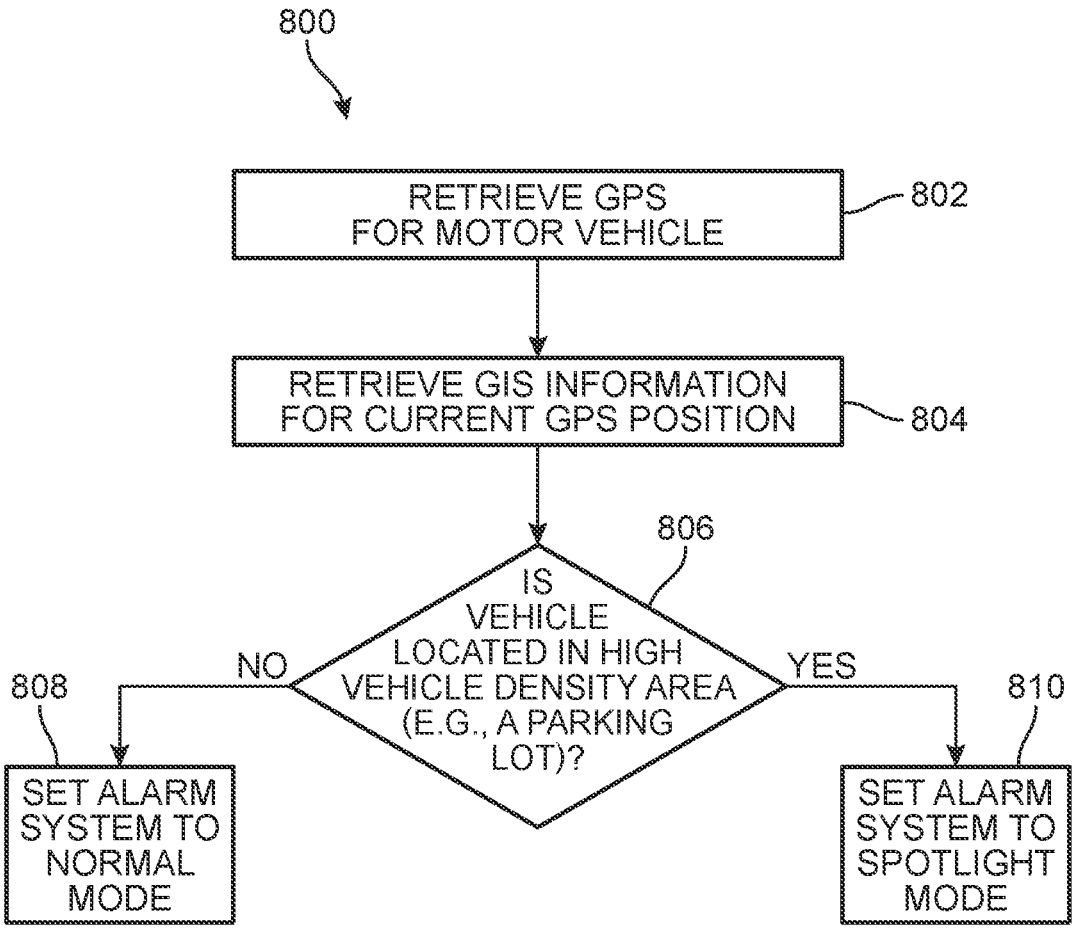
FIG. 8 is a schematic view of a process for placing one or more vehicles in a "spotlight mode," according to an embodiment.

FIG. 8 is a schematic view of a process 800 for placing one or more vehicles in a "spotlight mode." Here, the spotlight mode is a mode where vehicles only emit alarms when a messaging sound is detected and a person is detected nearby, as in the example shown in FIG. 7B. In particular, when multiple vehicles are all in the spotlight mode, this can create the sort of alarm pattern among densely parked vehicles shown in FIG. 7B.

In some cases, the alarm systems of each vehicle may only be configured to enter the spotlight mode when the vehicle is in an area of high vehicle density (such as a parking lot). Starting in step 802, alarm control unit 210 may retrieve a GPS position/location of the motor vehicle. Next, in step 804, alarm control unit 210 may retrieve GIS information for the GPS position retrieved in step 802.

In step 806, alarm control unit 210 determines, based on analysis of the GIS information (such as a map) for the vehicle's GPS position, if the vehicle is located in a high vehicle density area, such as a parking lot. If so, alarm control unit 210 operates in a spotlight mode in step 810. In the spotlight mode, the alarm system is only activated when a triggering sound is detected from another vehicle and a person is detected near the vehicle, as in the configuration shown in FIG. 4. If the vehicle is not located in a high vehicle density area, alarm control unit 210 operates in a normal mode in step 808, as in the configuration shown in FIG. 3B.

Figure 9:
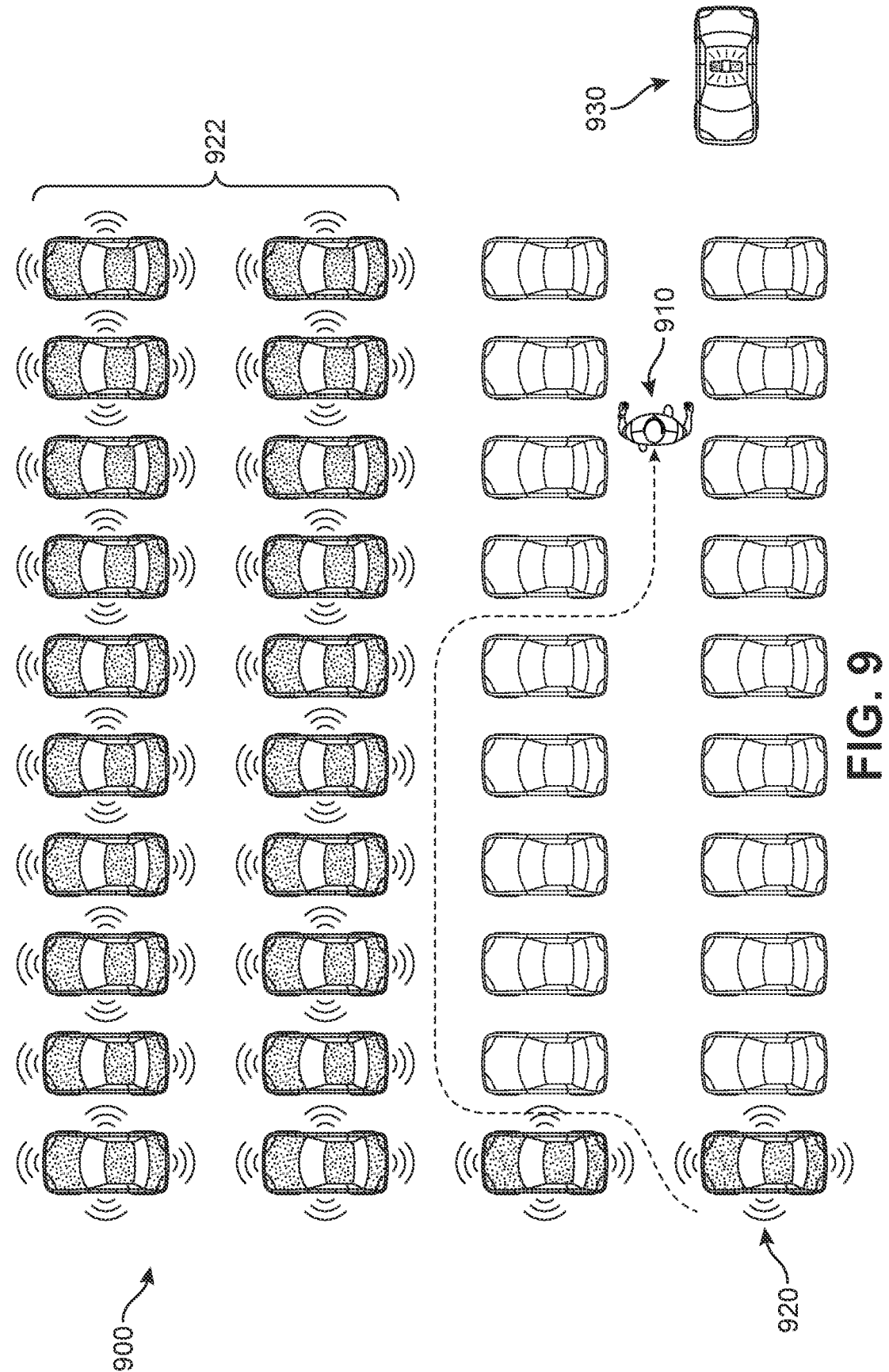
FIG. 9 is a schematic view of another pattern of alarms across a parking lot.

FIG. 9 is a schematic view of another pattern of alarms across a parking lot. Referring to FIG. 9, each vehicle in parking lot 900 may operate in a "guidance mode". In the guidance mode, a pattern of audible alarms may be generated among multiple vehicles so as to direct or guide a would-be thief/vandal in a particular direction. For example, in FIG. 9, after thief 910 tries to break into vehicle 920, vehicles 922 on a northern side of parking lot 900 are all activated to provide a "wall of alarms" that deter thief 910 from moving in that direction. This forces thief 910 towards the eastern side of parking lot 900 where a police car 930 is known to be stationed. In some embodiments, the selection of this particular alarm pattern to guide thief 910 towards police car 930 could be based on specific information gathered by the system at an earlier time. For example, prior to entering the guidance mode, the system could query another remote system to check for the presence of nearby police vehicles, or could retrieve information about likely locations of police cars based on historical data. In other cases, the selection of an alarm pattern could be based on other information. For example, alarm patterns could be selected to guide a thief/vandal into an area with significant lighting and away from darker locations where they could more easily escape detection by police or others or where more accurate videographic evidences of the suspect may captured in support of identification, interdiction, prosecution, and in the future-early alerting (upon return to the property or in case of a centralized suspect of interest notification system-return to any covered properties).

Figure 10:
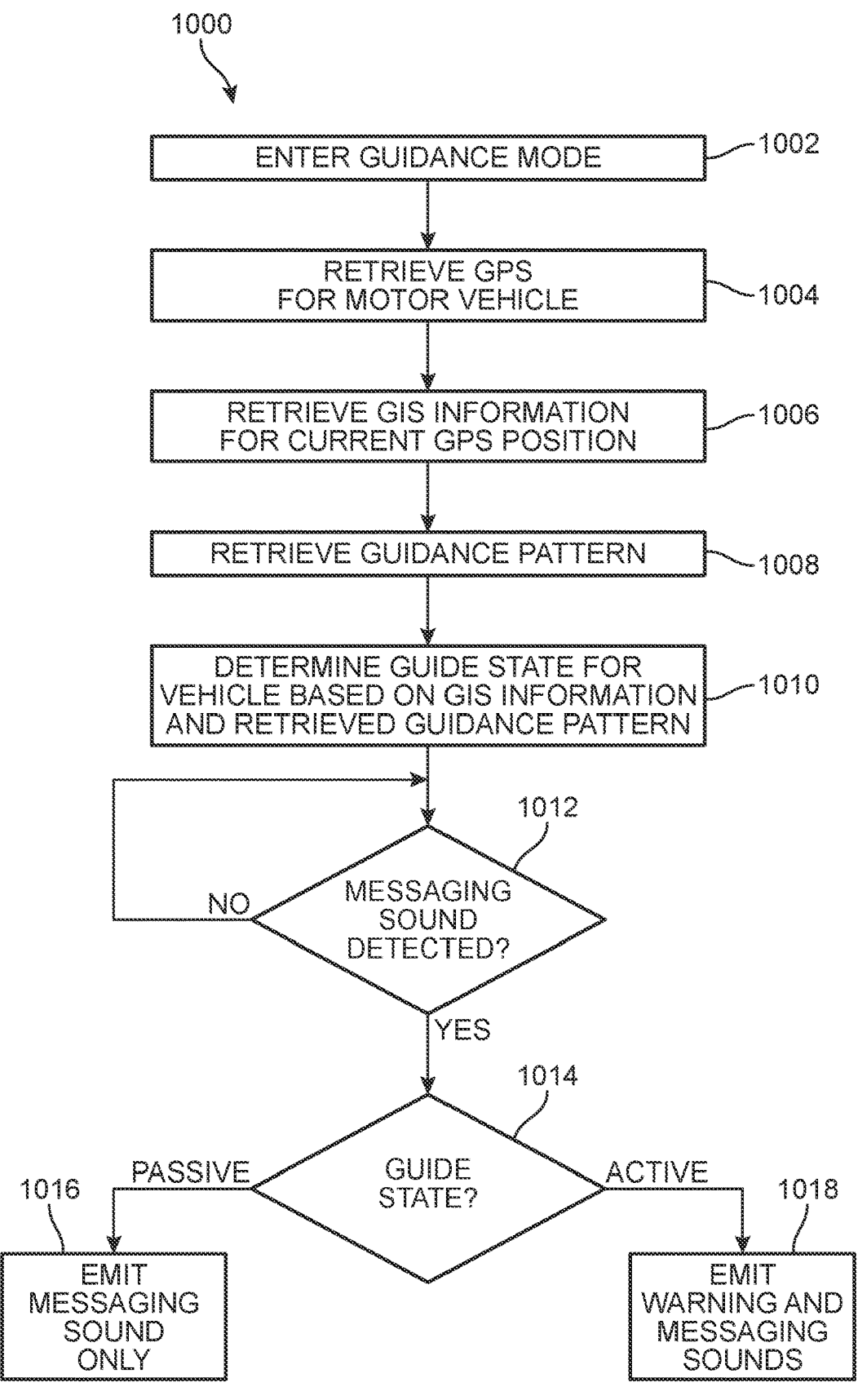
FIG. 10 is a schematic view of a process for placing one or more vehicles in a "guidance mode," according to an embodiment.

FIG. 10 is a schematic view of a process 1000 for operating each vehicle's alarm system in a guidance mode so as to generate the sort of scenario shown in FIG. 9. Process 1000 begins when alarm control unit 210 enters, or is already in, a guidance mode in step 1002. Criteria for entering a guidance mode in the first place could include, but is not limited to: the availability of alarm patterns for a given geographic area, the density of nearby vehicles, localized frequency of vehicle theft/vandalism, or other suitable factors.

After entering guidance mode, alarm control unit 210 proceeds to retrieve a GPS location for the motor vehicle in step 1004. Next, in step 1006, alarm control unit 210 retrieves GIS information for the current GPS position retrieved in step 1004.

In step 1008, alarm control unit 210 retrieves a guidance pattern. In some embodiments, a guidance pattern may be represented as a set of boxes defined by a grid. Each box of the grid corresponds to an approximate location for a vehicle. For example, in the parking lot shown in FIG. 9, each parking spot may be associated with a box in the guidance pattern.

The guidance pattern could be a set pattern, or could be selected based on information about the current location. For example, different guidance patterns could be selected for different types of geography (e.g., parking lots, city streets, etc.). In some cases, guidance patterns could be retrieved for specific locations with known features such as ease of access for police vehicles.

Once the guidance pattern is selected in step 1008, alarm control unit 210 may determine a guide state for vehicles based on GIS information and retrieved guidance patterns in step 1010. Here, a guide state may be either active or passive. In an active guide state, when triggered, a vehicle may emit both a warning sound and a messaging sound. In a passive state, when triggered, a vehicle may emit only a messaging sound. Moreover, in some cases, the messaging sound may be inaudible or else not easily discernible as a kind of alarm. This results in a configuration where only vehicles in an active mode give off audible alarms after detecting a messaging sound. Meanwhile passive vehicles can emit messaging sounds, but may not emit audible alarms themselves.

Once the guide state has been determined for each vehicle, according to its relative location and associated grid pattern, the alarm control system may wait for a triggering sound from another vehicle. If a triggering sound is not detected, the system simply waits and checks again for a messaging sound. If a messaging sound has been detected in step 1012, alarm control unit 210 proceeds to step 1014 to determine the (previously set) guide state. If the guide state is active, alarm control unit 210 proceeds to step 1018 to emit both warning and messaging sounds. If the guide state is passive, alarm control unit 210 proceeds to step 1016 to emit only a messaging sound.

Embodiments can include provisions for limiting uncontrolled spreading of vehicle alarms so that alarms are not triggered in vehicles far outside of the proximity of the original vehicle where the theft/vandalism initially occurred. In some embodiments, the volume of a messaging sound that is emitted by each alarm system can be set so that only vehicles within a relatively close proximity could detect the messaging sound. In some cases, the messaging sound could be generated at a much lower volume compared to the warning sound, so that the alarm may be heard past the distance where the messaging sound might trigger another alarm. Similarly, the threshold for detecting a messaging sound could be set relatively high, so that only messaging sounds arriving at the detector with a volume/amplitude greater than a threshold value, would be used in triggering an alarm.

Moreover, in some other embodiments, a messaging sound may only be emitted for a brief period of time, which may be much less than the time that a warning sound is emitted to warn-off a thief/vandal. This may help limit "feedback" triggering, whereby nearby vehicles alarms continue to set one another off in a feedback cycle.

To prevent a situation where an alarm is spread over a very long distance because vehicles are densely spaced over that long distance (for example, parked vehicles on very long city streets), embodiments could utilize an audible "counter" system. In such a system, a messaging sound could be emitted in bursts, where the number of bursts corresponds to a particular number of times the sound is repeated in a fairly short interval of time. For example, the initial vehicle to emit a messaging sound (such as vehicle 720 in FIG. 7A) could emit a single instance (burst) of the messaging sound. Each subsequent system detecting that messaging sound would add one to the burst count, so that the next set of vehicles to emit the messaging sound would detect a single instance of the messaging sound, and in response, emit two bursts of the same messaging sound. This could continue, with each system receiving a particular number of counts adding one more before emitting its own messaging sound, until the count reaches a maximum number. Any system detecting a messaging sound that has been repeated the maximum number of times would be programmed to ignore the messaging sound as a trigger. To achieve this configuration, the sound detecting unit of each alarm system could be configured to detect both the messaging sound, and to count how many times the messaging sound is repeated in a short interval of time (the number of bursts).

The embodiments described above utilize two separate sounds including a warning sound and a messaging sound, in order to facilitate increased control. For example, using a separate messaging sound allows for configurations where the messaging sound occurs briefly (such as for a few seconds or less), even when the warning sound might last for significantly longer (such as for several minutes or more). Likewise, using a separate messaging signal allows the signal to be repeated in bursts (adding informational content to the signal) without changing the familiar sound of a car alarm (which is the warning sound in the exemplary embodiments).

However, there may be situations where it is desirable to simplify the alarm system so that only one single sound is emitted. In such an embodiment, the same sound may function as both the alarm sound and the messaging sound. Such embodiments may require only a single sound emitting device, or a cheaper/simpler speaker system, thereby reducing costs of production, ease of installation, and easier maintenance.

In some embodiments, whenever the warning and/or messaging sounds are emitted, the GPS location of the vehicle and/or image of the suspected thief/vandal (captured by cameras in the vehicle) could be sent to police as well. This could warn police about a suspected thief and provide them with information about the suspect's location, as well as whether they may be armed (which may be discernible from the image).

In some embodiments, a system could include options for remotely triggering deactivation of an alarm system, including stopping further use of both warning and messaging sounds. For example, a user (such as the owner of the vehicle or a police officer) could remotely deactivate the alarm system for a vehicle using an application running on a smartphone.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/ or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

For each of the exemplary processes described above including multiple steps, it may be understood that other embodiments some steps may be omitted and/or reordered. In some other embodiments, additional steps could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. An alarm system for a motor vehicle, comprising:
a sound emitting unit that emits a first sound and a second sound, wherein the first sound is provides an audible warning to bystanders and wherein the second sound is a messaging sound for communicating information to at least one other vehicle;
a sound detecting unit, the sound detecting unit configured to detect sounds that are substantially similar to the second sound; and
an alarm control unit;
wherein when the alarm control unit receives information indicating that the sound detecting unit has detected the second sound, the alarm control unit signals the sound emitting unit to emit the first sound and the second sound.

2. The alarm system according to claim 1, wherein the first sound is audible and wherein the second sound is inaudible.

3. The alarm system according to claim 1, wherein the second sound is configured to be quieter than the first sound.

4. The alarm system according to claim 1, wherein the first sound and the second sound are associated with different frequencies.

5. The alarm system according to claim 1, wherein the sound emitting unit comprises a first sound emitting device that emits the first sound and wherein the sound emitting unit comprises a second sound emitting device that emits the second sound.

6. The alarm system according to claim 1, wherein the sound emitting unit comprises a speaker configured to play pre-recorded sounds.

7. A system for a motor vehicle, comprising:
an alarm control unit;
a sound emitting unit that emits a first sound and a second sound, wherein the first sound provides an audible warning to bystanders and wherein the second sound is a messaging sound for communicating information to at least one other vehicle;
a sound detecting unit, the sound detecting unit configured to send a first triggering signal to the alarm control unit when the sound detecting unit detects sounds sufficiently similar to the second sound;
a person detecting unit that receives information from a sensing device of the motor vehicle, and wherein the person detecting unit is configured to send a second triggering signal to the alarm control unit when the person detecting unit detects a person sufficiently close to the motor vehicle; and
wherein when the alarm control unit receives the first triggering signal and the second triggering signal within a sufficiently close period of time, the alarm control unit signals the sound emitting unit to emit the first sound and the second sound.

8. The system according to claim 7, wherein the sensing device is a camera and wherein the person detecting unit is configured to receive image data.

9. The system according to claim 7, wherein the sensing device is a proximity sensor and wherein the person detecting unit is configured to receive proximity information.

10. The system according to claim 7, wherein the sensing device uses lidar and wherein the person detecting unit is configured to receive lidar data.

11. The system according to claim 7, wherein the sensing device uses radar and wherein the person detecting unit is configured to receive radar data.

12. The system according to claim 8, wherein the person detecting unit includes a computer vision module for analyzing images from the camera.

13. The system according to claim 8, wherein the person detecting unit can receive proximity data from a proximity sensor, and wherein the person detecting unit uses both the image data and the proximity data to detect the person sufficiently close to the motor vehicle.

* * * * *